Sept. 29, 1970 K. M. GROETSCHEL 3,530,678

POSITION RESTORING DEVICES FOR MINE ROOF PROPS

Filed April 29, 1968 6 Sheets-Sheet 1

INVENTOR
Karl Maria Groetschel
BY Spencer & Kaye
Attorneys

POSITION RESTORING DEVICES FOR MINE ROOF PROPS

Filed April 29, 1968

INVENTOR:
Karl Maria Groetschel
BY Spencer & Kaye
Attorneys

POSITION RESTORING DEVICES FOR MINE ROOF PROPS

Filed April 29, 1968

INVENTOR:
Karl Maria Groetschel
BY Spencer & Kaye
Attorneys

INVENTOR:
Karl Maria Groetschel
BY Spencer & Kaye
Attorneys

Sept. 29, 1970 K. M. GROETSCHEL 3,530,678

POSITION RESTORING DEVICES FOR MINE ROOF PROPS

Filed April 29, 1968 6 Sheets-Sheet 6

INVENTOR:
Karl Maria Groetschel
BY Spencer & Kaye
Attorneys

United States Patent Office 3,530,678
Patented Sept. 29, 1970

3,530,678
POSITION RESTORING DEVICES FOR MINE ROOF PROPS

Karl Marie Groetschel, Stolzestrasse 44, Bochum, Germany

Filed Apr. 29, 1968, Ser. No. 724,763
Claims priority, application Germany, Apr. 28, 1967, G 49,952; Dec. 6, 1967, G 51,828
Int. Cl. E21d *23/00*
U.S. Cl. 61—45 28 Claims

ABSTRACT OF THE DISCLOSURE

A restoring device for correcting tilt of hydraulic props or angular deflection of a traction ram in a mine roof support is provided comprising a housing formed integrally with, or structurally separate from, the base of the support, such housing containing one or more rubber or the like non-metallic resilient bodies or metal springs at selected positions around a reference axis of the prop or ram, each such body or spring being subjected to pre-stress borne initially against stop means preventing such stress deflecting the prop or ram from its datum position but providing a threshold of restoring force to return the prop or ram to its datum position when deflected by horizontally applied loads on the superstructure of the support or by drift of a conveyor to which the traction ram is connected respectively.

BACKGROUND OF THE INVENTION

Field of the invention

This invention relates to a restoring device in or for use with a mine roof support of the kind including a base, one or more props disosed in sockets on the base and the roof-engaging superstructure carried by the prop or props.

The forces transmitted from the roof to the superstructure of such support, and which tend to displace the superstructure relative to the base in a direction generally parallel to the plane of the floor and roof of the mine working, tend to be unpredictable, both as regards the direction in which such forces act and as to their magnitudes.

In general, however, where a roof support of the kind referred to is utilised in supporting the roof of a mine working where mining is proceeding in accordance with the long wall method in which a series of laterally spaced supports are required to be advanced by traction means provided thereon towards the face of the working as extraction of the coal or other mineral material therefrom proceeds, the forces applied to the superstructure tend to be predominantly of two kinds.

Firstly, a force tends to be applied to the superstructure displacing same rearwardly relatively to the base in a direction approximately at right angles to the face of the working, thereby causing the props to tilt rearwardly in a vertical plane extending longitudinally of the support. Such force may arise when the support is under load between the floor and the roof of the working due to rearward displacement of layers of roof material under the pressure exerted thereon from the surrounding masses of rock or other material. Also when the support is relieved partially or wholly of load bearing relation relative to the roof, preparatory to advancement of the support or a part thereof where the support comprises two parts advanced in succession while the other part is maintained in each case in load bearing relation with the roof, a force tending to displace the superstructure rearwardly may occur by sliding frictional engagement between the superstructure and the roof and by engagement of the leading end of the superstructure with downward projection of roof material with respect to the general plane of the roof surface.

Further, forces may also be applied to the superstructure tending to displace this in a direction laterally of the support relatively to the base. These may arise when the support is under load between the floor and the roof from the causes previously mentioned. Also, however, such forces may be applied systematically tending to displace the superstructure in one lateral direction when the floor and roof of the mine working inclines in a direction along the length of the coal face so that the support as a whole operates with a lateral tilt. Part of the force tending to displace the superstructure laterally with respect to the base is due then to the weight of the superstructure and props supporting same, and part due to the tendency to movement of layers of roof material.

It is desirable that the props should be restored to a predetermined datum position relative to the base, usually, but not invariably, with the axes of the props at right angles to the base, when the support is brought by contraction of the props out of load bearing relation with the roof, so that the supporting forces furnished by the props may be applied initially at right angles, or in some other selected angular relationship between the floor and the roof best suited to meet the expected increase of load resulting from removal of the mined material.

It is, on the other hand, desirable that the props should be permitted to tilt to some extent in response to application of the forces above mentioned and which are applied to the superstructure tending to displace same relative to the base in a plane generally parallel to the floor and roof, otherwise severe bending stresses would be applied to the props, and the pistons thereof, and possibly the cylinders also, may be bent longitudinally and rendered unserviceable, and damage may be caused to the seals which operate between the cylinders and the parts of the pistons emerging axially therefrom.

Description of the prior art

It is known to provide rubber or the like rings embracing the cylinders of the props adjacent to the upper ends of the sockets in the base but this arrangement does not provide satisfactory control of tilt of the props or satisfactory restoration of the props to a datum position for a number of reasons.

Firstly, the rubber rings currently provided do not apply sufficiently great restoring forces to the props to return them to their datum positions, especially after a period of service when the rubber tends to take a permanent set or be otherwise damaged. In this respect, and even when the rings are newly installed, the restoring forces applied to the props by the rings diminish to a very low value as the prop approaches its datum position, and consequently where the support operates in an inclined mine working the rings fail ever to restore the prop to its datum position, this disadvantage becoming progressively accentuated with the onset of fatigue or permanent set in the rings.

Further, the rings have only a short service life and difficulties are encountered in removing and replacing them due to the fact that the prop concerned has to be removed from its socket in the base.

Further, such rings are not adapted to provide either ability to accommodate different degrees of tilt of the prop in different directions, or different magnitudes of restoring force in different directions, and hence in general are not well adapted to meet the varying conditions in these respects which occur in different mine workings.

One of the objects of the present invention is to provide a new or improved restoring device for use in or for a mine roof support by means of which these problems can be overcome or reduced.

SUMMARY OF THE INVENTION

From one aspect the present invention resides in the provision in or for a mine roof support including a base, one or more props disposed in sockets on the base, and roof-engaging superstructure carried by the prop or props, of a restoring device for returning the prop, or at least one of same, to a predetermined datum position upon release of such prop from load bearing relation with the roof and after such props have been subjected to tilt from said datum position about a tilting axis transverse to the length of the prop, such restoring device comprising the combination of a housing forming part of, or mounted on, the base and at least one resilient means in said housing arranged to provide a restoring force against the prop in a selected direction transverse to the length of the prop and at a position spaced longitudinally of the prop from said tilting axis, pre-stress means for subjecting said resilient means to pre-stress in a mode such as to oppose tilt of the prop from said datum position in said selected direction, and stop means opposing the pre-stress means for preventing the prop being displaced by the pre-stress means from its datum position.

From a further aspect in accordance with the invention a restoring device in accordance therewith comprises one or more units each formed of a body of rubber, metal or other resilient material adapted to be mounted on the base and to engage directly or indirectly an associated one of said props to be elastically stressed thereby when such prop is subjected to tilt, and a preset or adjustable structure for applying pre-stress to the body so that elastic strain or deformation of the latter takes place only after after the force tending to tilt the prop rises above a predetermined value.

From yet another aspect the invention resides in the provision of a restoring device comprising resilient means arranged to provide restoring force against the prop and presenting one stiffness characteristic over a range of tilt of the prop from its datum position, and thereafter presenting a higher or more steeply rising stiffness characteristic over a further range of tilt of the prop.

From yet another aspect the invention resides in the provision of a restoring device comprising at least one resilient means arranged to provide a restoring force against the prop in a selected direction transverse to the length of the prop and at a position spaced longitudinally of the prop from said tilting axis, said resilient means being adjustable angularly around the axis of the prop.

From yet another aspect the invention resides in the provision of a restoring device comprising a plurality of separate resilient means arranged to provide respective restoring forces against the prop in respective different selected directions spaced apart angularly about the axis of the prop and at positions offset longitudinally of the axis of the prop, and in each case spaced longitudinally of the prop from said tilting axis.

Although primarily the restoring device in accordance with the present invention has been developed for use in returning an associated prop to its respective datum position, it is recognized that the restoring device may be advantageously applied where similar or analogous requirements for restoration to a datum position arise in respect of a pressure fluid ram forming the traction means provided on the mine roof support.

In accordance with this aspect of the invention there is provided in or for a mine roof support including a base carrying one or more props, a roof-engaging superstructure carried by the prop or props, and a pressure fluid traction ram on the support for effecting advancement thereof, a restoring device for accommodating a transverse displacement of the traction ram during operation and for returning such ram to a predetermined datum position upon release of the ram from traction load.

BRIEF DESCRIPTION OF THE DRAWING

The invention will now be described, by way of example, with reference to the accompanying drawings wherein:

FIG. 12 is a plan view of a unit incorporating resilient means, pre-stressing means, and stop means which may be employed in any of the foregoing embodiments of restoring device referred to;

FIG. 13 is a view similar to FIG. 12 of an alternative similar unit;

DESCRIPTION OF THE PREFERRED EMBODIMENTS

Figure 1:
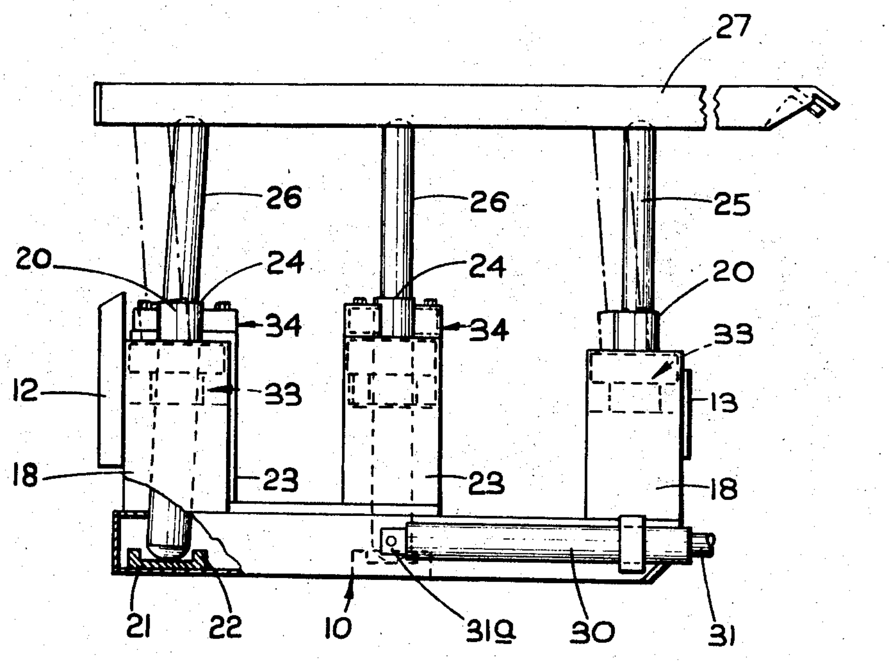
FIG. 1 is a view in side elevation of one embodiment of mine roof support equipped with restoring devices in accordance with the invention.
Figure 2:
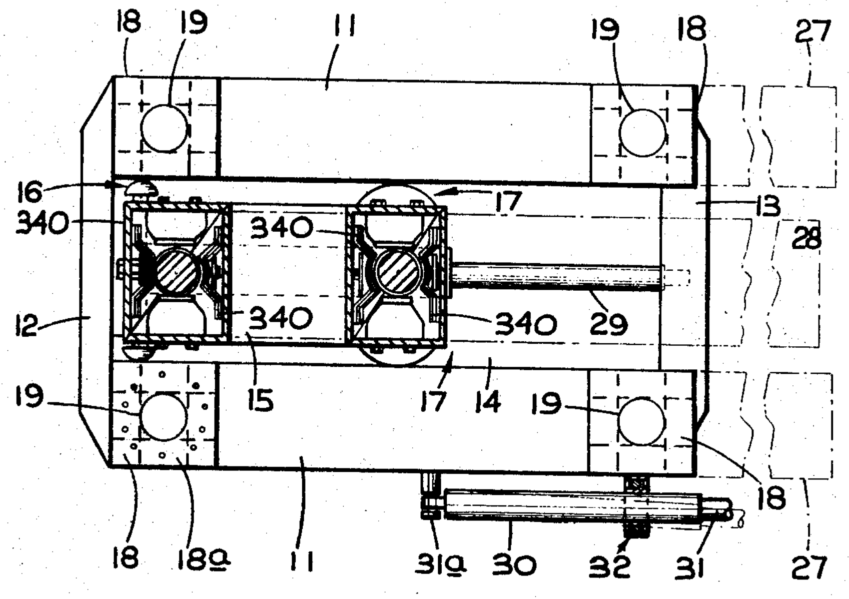
FIG. 2 is a plan view of the support shown in FIG. 1 with the superstructure removed.
Figures 3, 4, 5:
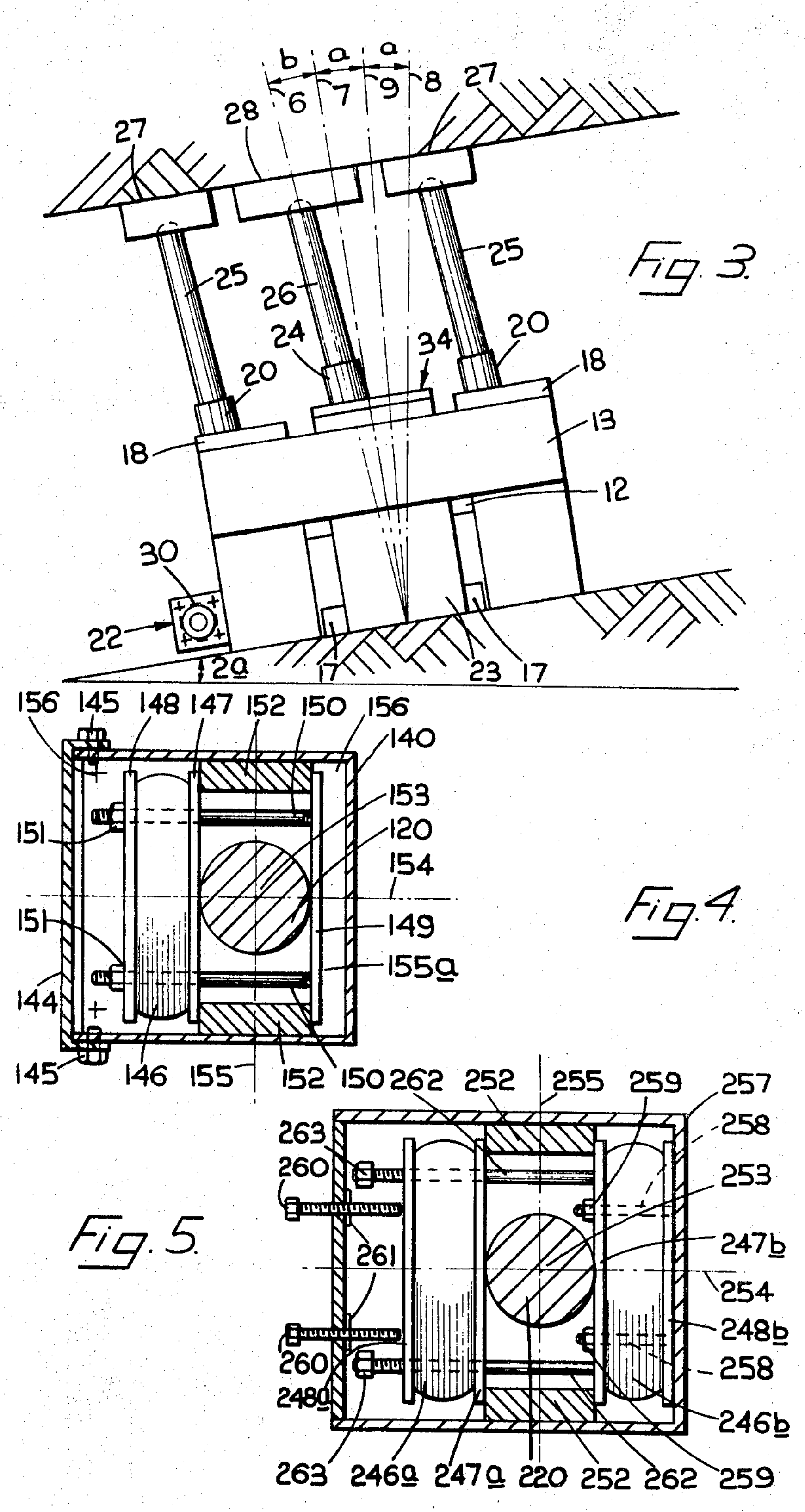
FIG. 3 is a view in end elevation of the support of FIGS. 1 and 2 shown in operation in a mine working having an inclination laterally of the support.
FIG. 4 is a fragmentary plan view in horizontal cross-section of one embodiment of restoring device in accordance with the invention.
FIG. 5 is a view similar to FIG. 4 of a second embodiment of restoring device in accordance with the invention.

Referring firstly to FIGS. 1 to 3, the mine roof support to which one or more restoring devices in accordance with the invention may be applied is intended for use in the long wall method of coal mining.

In this method coal is extracted by traverse of a coal-getting machine along a generally vertical coal face and the coal thus extracted is discharged on to a conveyor extending along, and adjacent to, the face and which is required to be advanced towards the newly exposed coal face as a layer of coal is extracted in each traverse of the coal-getting machine.

Supports such as those illustrated in FIGS. 1 to 3 are disposed on the side of the conveyor remote from the coal face but the superstructure of such supports engages and furnishes support to the roof of the working on the side of the conveyor remote from the coal face, over the conveyor itself, and in a region immediately adjacent to the coal face. Such supports may, as illustrated, be of the kind having two parts, each of which is advanced by a traction means whilst the other part is in load-bearing relation to the roof. Alternatively such supports may consist of only one part and the traction means may then operatively connect the support with a section of the conveyor, firstly to advance the conveyor with the support in load-bearing relation to the roof, and thereafter, when the support is out of load-bearing relation to the roof, to draw up the support to the conveyor.

Problems relating to maintenence of props of the support and hydraulic rams acting as traction means in a predetermined angular relationship with the base or other part of the support on which they are mounted are, in many respects, analogous and it is to be understood that the description hereinafter appearing, although predominantly related to the props, is applicable also to the traction ram or rams.

Referring specifically to the construction and arrangement of the support, this is generally as more fully disclosed and claimed in my co-pending application No. 682,867 which is to be deemed part of the present disclosure. For convenience, however, it is noted that the support comprises a base 10 which includes an outer base element having side members 11 rigidly connected to each other at opposite ends by cross members 12 and 13, and affording between them a longitudinally extending gap or slot 14. In this is disposed an inner base element 15 having lateral clearance with respect to the inwardly presented side faces of theside members 11, and which is movable longitudinally in the gap or slot 14 in a predetermined orientation in a plane parallel to the floor of the mine working by guide means including an adjustable guide device 16 and a fixed guide device 17.

The outer base element has four upstanding sockets 18 conveniently, but not essentially, of rectangular shape in cross-section formed of metal plates welded to each other at the vertical corners, and at the upper end having top plates formed with circular apertures 19 providing substantial radial clearance with respect to prop cylinders 20 seated in the sockets. Each prop cylinder is received at its lower end in a shallow recess formed by a pad 21 having an upstanding peripheral wall 22 as seen for the rearmost prop cylinder 20 in FIG. 1, such pad prevents translatory displacement of the lower end of the prop cylinder and, in effect, defines a horizontal axis or axes about which the prop can tilt within the limits permitted by the clearance between the prop cylinder and the aperture 19.

The inner base element 15 is of similar form in that it includes two upstanding prop sockets 23 containing props having cylinders 24 also capable of tilting about horizontal axes adjacent to their lower ends.

The piston rods 25 and 26 extending upwardly from cylinders 20 and 24 carry a roof-engaging superstructure which includes two parts, one supported by the props of the outer base element and one by the props of the inner base element. The outer part comprises laterally spaced, longitudinally extending, beams 27 projecting forwardly of the base into a region above, and forwardly of, the conveyor when the support is in use, such beams being connected rigidly to each other by cross members (not shown) cranked downwardly for portions of their length disposed between the beams 27 to define a channel of a width comparable with that of the gap or slot 14. The part of the superstructure supported by the props of the inner base element is also in the form of a roof bar or beam 28 disposed in the channel and having clearance with respect to the lateral boundaries thereof to permit it to move angularly in a plane parallel to the floor and roof with the inner base element under the control of the guide devices 16 and 17 in combination.

A double-acting hydraulic traction ram 29 operatively connects the two base elements. Externally the outer base element is provided with a further traction ram having a cylinder 30, the piston rod 31 of which is adapted for connection to the section of the conveyor situated forwardly of the support when in use. The cylinder 30 is pivotally connected at its rearward end to a bracket 31*a* in a manner permitting it to pivot at least to a limited extent in a plane parallel to the floor and in a vertical plane extending longitudinally of the support. The cylinder of the traction ram 30 is further supported at a position spaced forwardly of the bracket 31*a* by a restoring device in accordance with the invention as hereinafter described, such being indicated generally at 32.

To permit the props of the outer base element to tilt in a vertical plane extending longitudinally of the support and also, when required, to tilt laterally in a vertical plane extending at right angles to said longitudinal plane, each of the prop cylinders 20, besides being located by a pad such as 21, 22, is constrained yieldably towards its initial or datum position by a restoring device indicated generally at 33 and contained in a housing constituted in this case by the upper portion of the associated socket 118 of the outer base element.

Although the prop cylinders 24 could be similarly controlled as regards the angular relation of their axes to the inner base element by restoring devices contained in prop sockets 23, I have shown, by way of example, an alternative embodiment of the invention wherein a restoring device 34 provided for each of these prop cylinders includes its own housing and such is detachably mounted externally of the prop socket 23 on the top wall thereof.

It is to be understood that any of the props may be equipped with a restoring device mounted externally or internally of the prop socket and in the latter case, although the upper portion of the prop socket would, for convenience, form also the housing for the restoring device, it would be possible for restoring devices including their own housings to be mounted internally of the prop socket instead of externally thereof. Reference hereafter to "socket means" is intended to include generically all such arrangements. It will be noted that the sockets 18, whether considered alone or effectively extended upwardly by the housings mounted thereon, enclose at least the major proportion of the lowermost elements of the props, namely the cylinders 20, 24.

It is to be understood that the constructions of restoring device hereinafter described in detail, although intended primarily to be used for restoring the props to respective datum positions about respective tilting axes, are also capable of utilisation for restoring the traction ram 30 to a datum position as a result of the traction ram being displaced angularly about vertical or horizontal pivotal axes defined by the pivotal connection to the bracket 31*a*. In this latter case, as will be evident from the showing in FIG. 2, the resilient means incorporated in the restoring device act between a wall of the housing of such device and the cylinder element of the traction ram adjacent to the end of the cylinder element remote from the bracket 31*a*. Such resilient elements would be arranged to act between a horizontally presented side of the ram cylinder and the opposing wall of the housing, and further resilient elements may be provided to act between a vertically presented side of the ram cylinder and the housing where it is desired to restore the traction ram to a datum position relative to angular displacements in a vertical plane, i.e. about a horizontal axis at the bracket 31*a*. This will be evident from the following description wherein, in general, constructions of restoring device providing for restoration in transverse directions have their resilient elements so arranged as to provide restoring forces in directions at right angles to each other.

Referring now specifically to the arrangement of restoring device illustrated in FIG. 4, the prop cylinder to which same is applied is shown diagrammatically at 120 and is to be understood as supported at its lower end in the manner illustrated in FIGS. 1 to 3.

The restoring device comprises a housing formed in two parts 140 and 144 of which the latter forms a closure member to an open side of the latter and is detachably secured thereto by fastening elements such as bolts 145. Removal of the closure member 144 premits the component parts of the restoring device accommodated in the housing to be inserted and withdrawn into and from the housing without removal of the prop from the socket.

The restoring device comprises a resilient means in the form of a block or body 146 of rubber or other non-metallic material having similar properties of elasticity. The body 146 is disposed between an inner plate member 147 and an outer plate member 148 which, in combination, exert compressive pre-stress on the body 146 in a direction at right angles to the planes of these plate members.

The outer plate member 148 is connected to a further plate member 149 by tie rods 150 welded or otherwise secured to the stop plate member passing with clearance through holes in the inner plate member 147 and the rubber body 146 and terminating in screw-threaded portions carrying nuts 151 accessible for tightening upon removal of the closure member 144.

The plate members 147 and 149 have vertical margins incontact with stop members 152 formed on, or secured to, opposing side walls of the part 140 of the housing.

The tie rods 150, nuts 151 and plates 147 to 149 act firstly as a pre-stressing means which apply the compressive pre-stress previously mentioned to the rubber body 146, the magnitude of the pre-stress being determined by the degree to which the nuts 151 are tightened.

The stop members 152, together with plate members 147 and 149, also act as a stop means determining the datum position of the prop axis 153 with respect to tilt in a vertical plane 154.

It will be evident that tilt of the prop in this plane to the left can take place when once the force tending to tilt the prop exceeds that with which the inner plate member 147 is pressed against the stop members 152 by the pre-stress in the rubber body 146. Similarly tilt of the prop in the plane 154 to the right can take place when once the force tending so to tilt the prop exceeds that with which the further plate member 149 is pressed against the stop members 152 by the pre-stress in the rubber body 146. In this latter case it will be noted that a clearance space 155*a* exists between the further plate member 149 and the adjacent parallel wall of the part 140 of the housing.

Although not illustrated the structure contained within the housing 140 may be duplicated with the second rubber body 146 displaced angularly about the axis of the prop 153 by an angle of 90° so as to provide restoring force relative to tilt of the prop in a vertical plane 155 at right angles to the plane 154. The duplicated structure would be conveniently offset longitudinally of the prop from that visible, the housing 140 having sufficient depth to accommodate both structures.

The housing 140 is provided with means for securing it to the top plate of the prop socket externally thereof in any of a number of positions of angular adjustment about the axis 153. Such means may comprise holes indicated diagrammatically at 156 in the bottom wall of the housing for the reception of fastening elements such as bolts extending into, and threadably engaged with, respective internally threaded holes in the top wall of the prop socket, a plurality of such latter holes being provided at angularly spaced intervals corresponding to the adjustment steps required. Such are illustrated, by way of example, at 18*a*, FIG. 2, in respect of one only of the prop sockets although they may be provided on each of same as required.

In the second embodiment illustrated in FIG. 5, parts corresponding functionally to those already described with reference to FIG. 4 are designated by like numerals of reference with the substitution of the prefix 2 for the prefix 1, and the preceding description is to be deemed to apply.

In this case, however, the housing as illustrated at 257 is constituted by an upper portion of the prop socket and presents an upwardly directed openng at its upper end by virtue of a removable top wall which may be split or divided along a diametral plane with respect to the prop axis 253 to admit of removal without removal of the prop from the socket.

In this case the resilient means comprises two rubber bodies 246*a*, 246*b* pre-compressed respectively between inner and outer plate members 247*a*, 247*b* and 248*a*, 248*b*.

Pre-compression in the case of the rubber body 246*b* is effected by tie rods 258 having end portions screw-threaded and carrying nuts 259, whilst pre-compression of the rubber body 246*a* is effected by means of screw-threaded bolts 260 having heads disposed externally of the prop socket and operating through threaded openings therein supplemented optionally by nuts 261 welded to the inner face with the inner ends of these bolts bearing against the outer plate member 248*a*.

With respect to tilt of the prop in a vertical plane 254 to the left of its datum position, such will occur when the force tending to produce such tilt exceeds that exerted by the inner plate 247*a* against the stop members 252 due to pre-compression of rubber body 246*a*.

Figure 14:
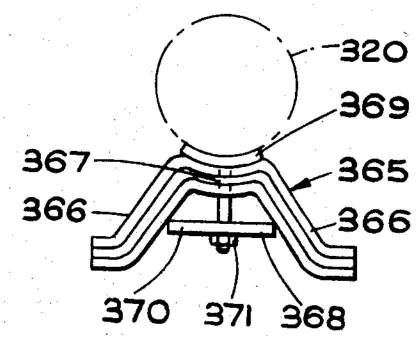
FIG. 14 is a view similar to FIG. 12 of an alternative similar unit.

With respect to tilt in the plane 254 to the right as seen in FIG. 14, such will take place when the force tending to produce same exceeds the force exerted by the inner plate member 247*b* against the stop members 252.

For the first range of such tilt the restoring force will be derived wholly by the additional compressive stress applied to the rubber body 246*b*. The rubber body 246*a* is, however, operatively connected with the inner plate member 247 to provide additional stiffness to continued tilt of the prop beyond a predetermined angle from the datum position by force transmitting means affording lost motion for the first stage of prop tilt. Such force transmitting means comprise tie rods 262 anchored to the plate member 247*b* and passing with clearance through plate members 247*a* and 248*a* and the rubber body 246*a*, so that additional compression is only applied to the latter when the heads 263 of the tie rods engage the outer plate member 248*a*.

This arrangement provides a two-stage stiffness characteristic with a lower stiffness or lower rate of rise of stiffness for the first range, and a higher stiffness or a higher rate of rise of stiffness for the second range of prop tilt.

The angular deflection of the prop forming the first range can be adjusted in magnitude by screwing in the tie bolts 262 to decrease the clearance between their heads and the plate member 248*a*. The initial restoring force provided by each rubber body can be adjusted by adjusting the pre-compression as by adjustment of nuts 259 and bolts 260.

As before, this structure may be duplicated and effectively displaced angularly about the axis 253 through an angle of 90° to provide similar control over tilt in a vertical plane 255.

Figure 6:
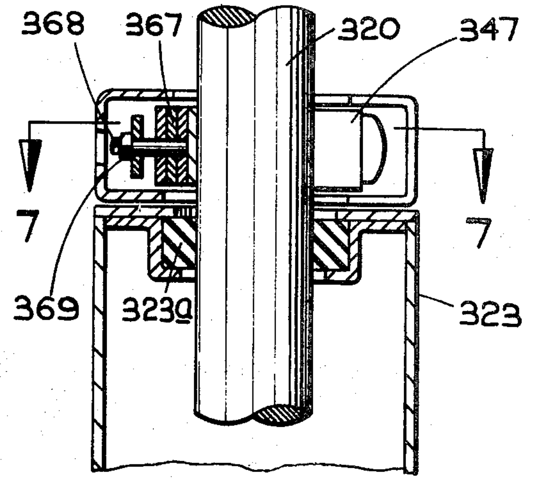
FIG. 6 is a view in side elevation and in cross-section on the line 6—6 of FIG. 7 of a third embodiment of restoring device in accordance with the invention.
Figure 7:
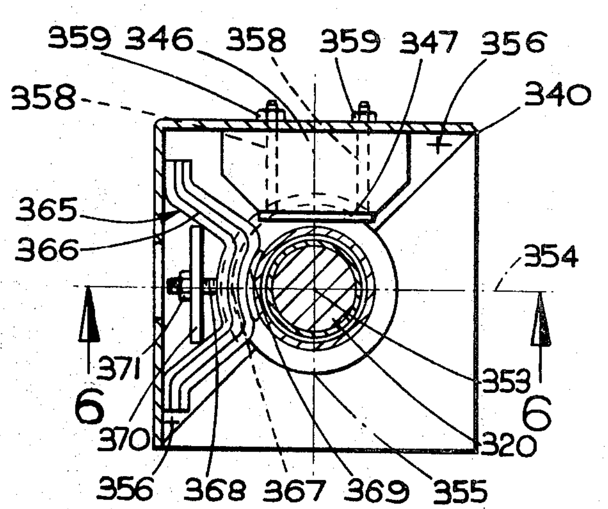
FIG. 7 is a plan view of the embodiment shown in FIG. 6 in cross-section on the line 7—7 of FIG. 6.

In the embodiment illustrated in FIGS. 6 and 7 parts corresponding functionally to those already described are designated by like numerals of reference with the substitution of the prefix 3 for the prefixes 1 or 2, and the preceding description is to be deemed to apply.

This embodiment of restoring device is that shown by example applied to the sockets 323 of the inner base element. The restoring device comprises a generally L-shaped housing 340, as seen in plan, equipped with two resilient means, associated pre-stress means, and associated stop means operating in planes 354 and 355 respectively. By way of example different forms of resilient means, pre-stress means, and stop means are illustrated but it will be understood that like forms may be employed within the housing 340 if desired.

One of these resilient means is formed as a body of rubber or similarly resilient non-metallic material 346 pre-compressed between one wall of the housing and an inner plate member 347 by tie rods 358 screw-threaded at their outer ends and carrying nuts 359. The tie rods and nuts also act as stop means limiting inward travel of the inner plate member 347 towards the axis 353 of the prop.

The other resilient means comprises a plurality of leaf springs 365 each having two outer limbs 366 arranged in V formation and connected by connecting portions 367 presenting concave faces inwardly towards the prop axis. The pre-stress means comprises a tie rod 368 connected at one end to a contact plate 369 and passing through an outer plate member 370, the outer end portion of the tie rod being screw-threaded and carrying a nut 371 which, when tightened, stresses the assembly of leaf springs by way of a bending stress.

The concave inwardly presented faces of the inner plate member 369 conforms or corresponds in curvature to the cylindrical face of the prop cylinder but could be of planar form to admit of simultaneous tilt in both planes 354 and 355.

If it is desired to provide resilient means at opposite sides of the prop operative in both planes 354 and 355, the structure seen in FIGS. 6 and 7 would be duplicated and assembled as illustrated in FIG. 2, wherein the two housings 340 each of generally triangular form collectively form rectangular housings mounted on the top walls of to top sockets 23. Securement may be by way of fastening elements such as bolts passing through holes shown diagrammatically at 356 and engaging in threaded holes in the top wall of the prop socket.

The prop socket 323 is formed at its upper end with an annular chamber in which may be accommodated a conventional rubber ring **323*a***, the inner rim of the lower flange of the annular chamber providing sufficient radial clearance to allow prop tilt to take place under the control of the restoring device.

Figure 8:
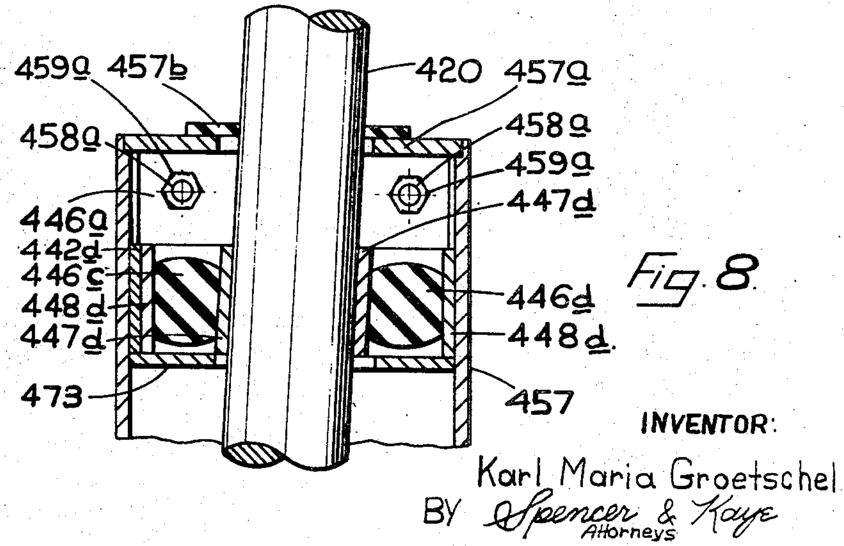
FIG. 8 is a view in cross-section on the line 8—8 of FIG. 9 of a fourth embodiment of restoring device in accordance with the invention.
Figure 9:
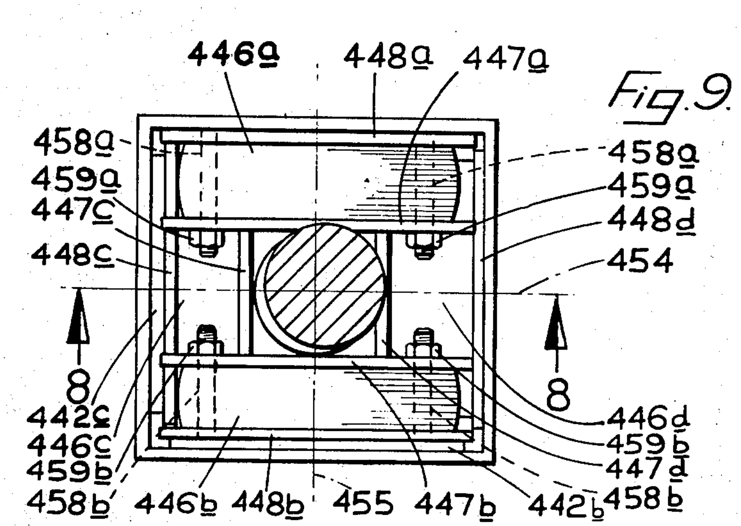
FIG. 9 is a plan view of the embodiment of FIG. 8 with the cover of the socket of the base removed.

In the embodiment illustrated in FIGS. 8 and 9 parts corresponding functionally to those already described as designated by like numerals of reference with the substitution of the prefix 4 for prefixes 1, 2 or 3, and the preceding description is to be deemed to apply.

In this embodiment resilient means are provided on two sides of the prop which can tilt in planes 454 and 455.

The resilient means comprises rubber bodies **446*a*, 446*b* and rubber bodies 446*c*, 446*d*** in a plane spaced axially of the prop from the first said pair of bodies, each being precompressed between inner and outer plates.

The inner and outer plates **447*a*, 448*a* and 447*b*, 448*b* on opposite sides of the rubber bodies 446*a*, 446*b* respectively are connected by tie bolts 458*a*, 458*b* enabling the compressive pre-stress to be adjusted. Any clearance between the side walls of the housing and the outer plates can be filled by packing plates 442**.

It will be noted that the datum position of the prop in this case can be adjusted by varying the number or thickness of packing plates such as 442. Alternatively bolts extending through screw-threaded holes in the side walls of the housing and bearing against the outer plates, such as **448*a*, 448*b***, can replace the packing plate or plates.

The prop socket 457 is provided internally with a shelf 473 upon which the bodies **446*c* and 446*d* and their associated inner and outer plate members rest whilst the remaining bodies 446*a* and 446*b*** and their plate members rest on top of the former bodies and plate members.

Insertion and withdrawal of the rubber bodies and their associated plate members is effected through the open upper end of the prop socket 457 which is provided with a cover plate **457*a* resting on a shoulder or rebate formed internally on the side walls of the prop socket adjacent to the upper end. Further, an anti-dust closure member 457*b* formed of rubber or other similar material may be provided on top of the cover 457*a* and may embrace the prop 420**, but may be slidable up the prop to permit the cover to be similarly removed when required.

Figure 10:
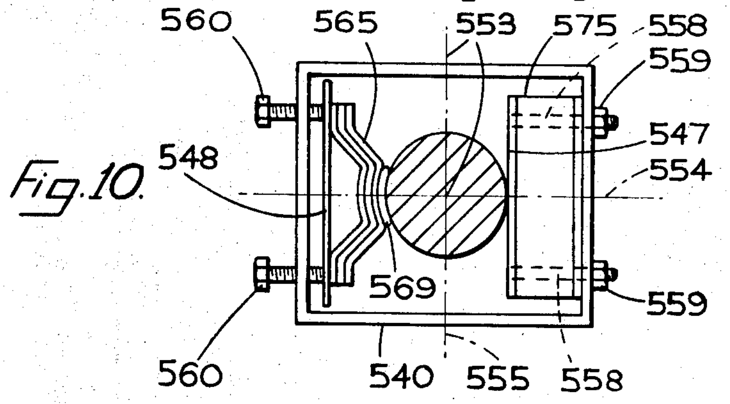
FIG. 10 is a plan view of a fifth embodiment of restoring device in accordance with the invention, a cover plate of the prop socket being removed.

Referring to the embodiment shown in FIG. 10, parts corresponding functionally to those already described are designated by like numerals of reference with the substitution of the prefix 5 for the prefixes 1 to 4, and the preceding description is to be deemed to apply.

In this embodiment a resilient means comprising an assembly of leaf springs 565 is subjected to precompression by an externally operable pre-compression means comprising outer plate member 548 and externally operable bolts 560.

The stop means may be formed by another resilient body 575 disposed between inner and outer plate members as shown and subjected to precompression by tie rods 558 and nuts 559.

Figure 11:
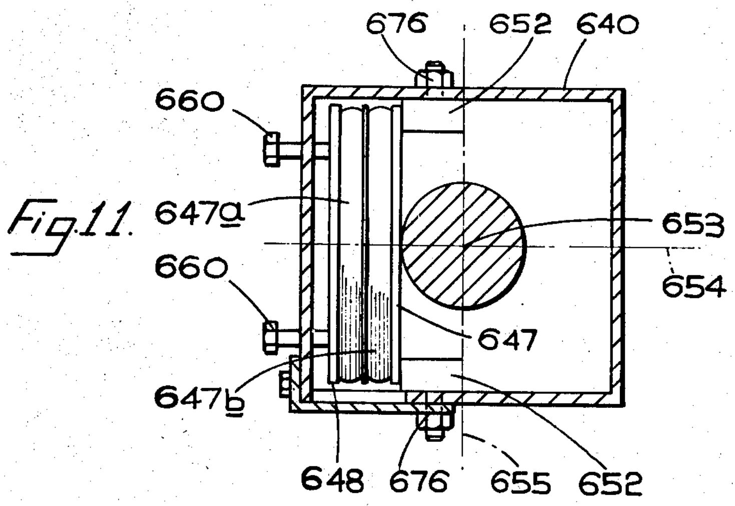
FIG. 11 is a plan view of a sixth embodiment of restoring device in accordance with the invention, a cover plate of the prop socket being removed.

Referring to the embodiment shown in FIG. 11, parts corresponding functionally to those already described are designated by like numerals of reference with the substitution of the prefix 6 for the prefixes 1 to 5, and the preceding description is to be deemed to apply.

In this embodiment the resilient means comprises two rubber bodies **646*a*, 646*b* disposed at the same side of the prop subjected to pre-compresssion between inner and outer plate members 647 and 648 by bolts 660 operable externally of the prop socket 640 with the inner plate member bearing against stop members 652**.

The datum position of the prop is controlled by the position of the stop members which are adjustable in a direction parallel to the plane 654, for example by providing screw-threaded studs on the stop members projecting through slots extending horizontally in opposed side walls of the prop socket, such studs being furnished with clamping nuts 676.

In any of the foregoing embodiments the units comprising resilient means and pre-stress means, which latter may act also as a stop means, may be replaced by those illustrated in FIGS. 12 to 17 in which in each case parts corresponding to those previously described are designated by like numerals of reference with a distinctive prefix in the group 7 to 10 substituted for the prefixes previously utilised.

Figures 12, 13:
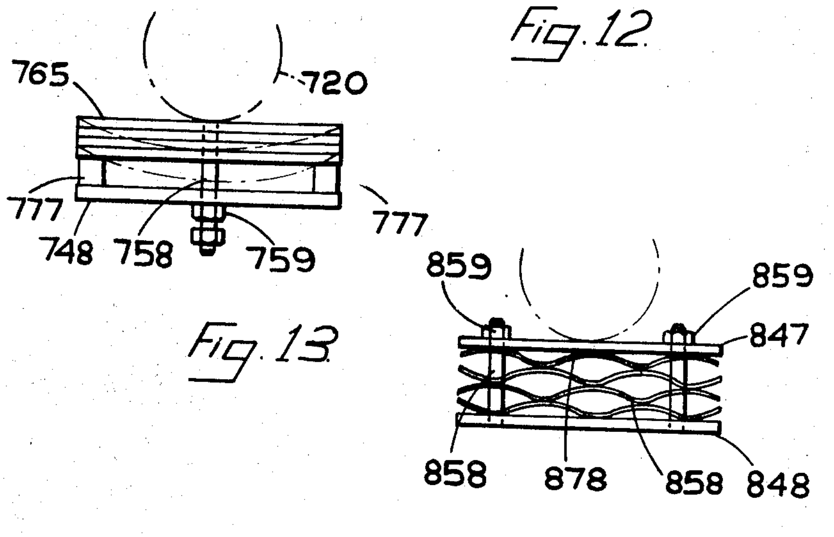

Referring to FIG. 12, the resilient means comprises an assembly of leaf springs 765 which are of convex form in their unstressed state arranged to present the convex side towards the prop cylinder 720. The outer plate member 748 is provided with bearer bars or blocks 777 at its outer margins. The pre-stress means further comprises tie rod 758 anchored to the innermost of the leaf springs 765 and carrying a nut 759 on a screw-threaded portion projecting to the outer side of plate member 748. This unit may be pre-stressed by tightening the nut 749 preparatory to insertion into a housing formed by either the upper portion of the prop socket or a housing individual to the restoring device. The nut 759, in combination with the plate member 748, acts also as the stop means.

In the unit shown in FIG. 13 an assembly of wavy or sinuous leaf springs 878 are pre-compressed between inner and outer plate members 847, 848 by tie rods 858 carrying nuts 859 on screw-threaded inner end portions. Such nuts and the plate member 847 act as the stop means. The unit is capable of pre-compression before insertion, as in the case of that shown in FIG. 12.

In FIG. 14 the unit shown is similar to that incorporated in the embodiment of FIGS. 6 and 7 and need not further be described.

Figure 15:
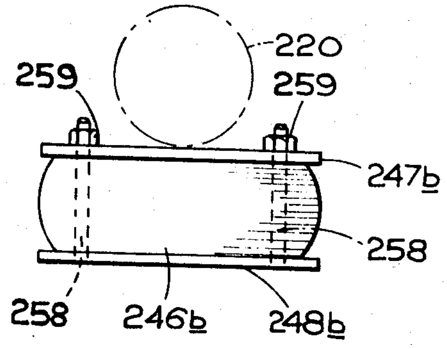
FIG. 15 is a view similar to FIG. 12 of an alternative similar unit.

The unit illustrated in FIG. 15 is similar to that included in the embodiment shown in FIG. 5 and likewise is not further described.

Figure 16:
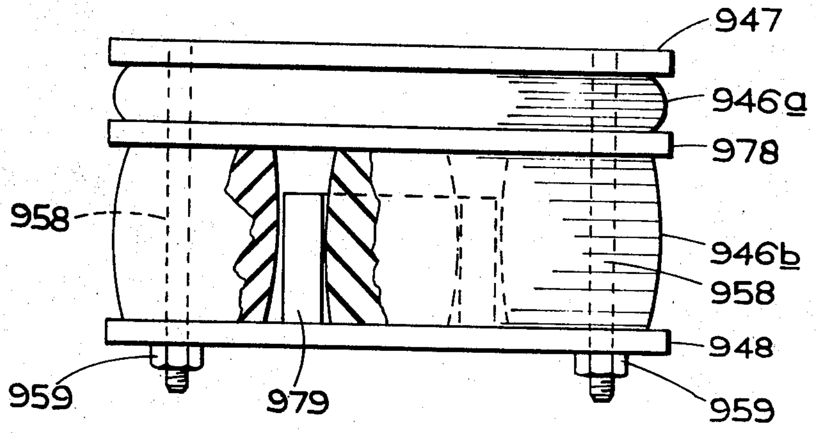
FIG. 16 is a view partly in cross-section but otherwise generally similar to FIG. 12 of an alternative similar unit providing different stiffness characteristics in successive stages of operation.

Referring now to FIG. 16, the unit shown includes two rubber bodies **946*a* and 946*b* forming the resilient means and effectively operating in series to transmit restoring force from a housing to the prop. Such bodies are subjected to pre-compressive stress between inner and outer plate members 947, 948 and an intermediate plate member 978, of which the two first mentioned are connected by tie rods 958 anchored to the inner plate member 947 and carrying nuts 959** on screw-threaded end portions.

Fixed, or adjustable, length spacer elements 979 are provided in openings in the body **946*b* having dimensions less than the initial separation between plate members 948 and 978** but capable positively of limiting inward movement of these plate members towards each other after a first stage of prop tilt.

During this stage the stiffness characteristics are determined by those of the rubber bodies **946*a*, 946*b* acting effectively in series. During a subsequent stage of prop tilt the stiffness characteristics are determined by the body 946*a*** alone. This stiffness characteristic will ordinarily be higher or have a higher rate of increase than that applicable to the first stage of prop tilt.

Figure 17:
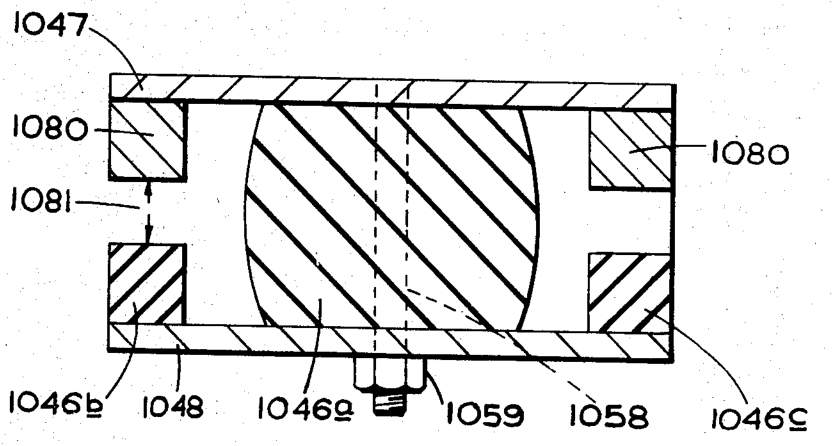
FIG. 17 is a view similar to FIG. 16 but in horizontal cross-section of an alternative unit also providing different stiffness characteristics in successive stages of operation.

Referring to FIG. 17, rubber bodies **1046*a*, 1046*b* and 1046*c* operate effectively to transmit restoring force to the prop in parallel with each other, such bodies being disposed between inner and outer plate members 1047 and 1048, of which the latter carries the rubber bodies 1046*b* and the former carries abutment blocks or bars 1080**.

Compressive pre-stress is applied by tie rods such as 1058 fixed to the inner plate member 1047 and carrying nuts such as 1049 on screw-threaded outer end portions of the tie rods.

The dimensions of blocks or bars 1080 in a direction at right angles to the plate member 1047 is selected to provide a predetermined gap 1081 which ensures that the bodies **1046*b*, 1046*c* are not stressed during a first stage of prop tilt in which the stiffness characteristics are determined wholly by the body 1046*a***.

During a successive stage of tilt stiffness characteristics are determined by all of the bodies **1046*a* to 1046*c*** acting in parallel and the stiffness will be generally higher or increase more rapidly per unit angle of tilt of the prop than is the case over the first stage without the level of stress being such as to damage the resilient means.

Where different stiffness characteristics are provided in successive stages, as in the embodiment shown in FIG. 5 or any of the other embodiments utilising the units of FIG. 16 and 17, the stiffness characteristic during the initial stage of prop tilt is selected to be not more than is adequate reliably to restore the prop to its datum position.

This minimises the stress imposed on components of the sealing means operative between the prop cylinder and piston rod and contributes to extended service life of these components.

The second stage of prop tilt brings into operation a higher value of restoring force necessary, for example, to enable the superstructure to ride beneath some projections presented by the roof surface without the props being positively restrained from further tilt, thereby minimising the risk of damage by bending to the piston rods of the props.

Referring to operation of the restoring device relative to the props of the roof support shown in FIGS. 1 to 3, the chain line positions of the props which are mounted on the outer base element and which are shown in FIG. 1, represent a typical rearward tilt for these props occuring by virtue of one of the causes hereinbefore mentioned.

The provision of any of the foregoing restoring devices accommodated in the interiors of the prop sockets 18, as indicated generally at 33, or the provision of restoring devices contained in their own housings and mounted on the top walls of these prop sockets, serve to restore the props to an upright datum position, as seen in side elevation, upon lowering of the props and release of the beams 27 from load-bearing relation.

If, as illustrated in FIG. 3, the support is operated in a working which has an inclination lengthwise of the coal face, that is laterally of the support, the adjustment means such, for example, as the adjustable stop members 652 in FIG. 11, would preferably be adjusted to provide a datum position for the props as represented by the axis 9 which bisects the angle between a vertical reference axis 8 and an axis 7 which is perpendicular to the plane of the floor and roof.

The axis 6 then represents the extent to which tilt would typically occur during operation, the restoring devices serving to return the props with which they are associated into the position represented by the axis 9. The angle *b* between the axes 6 and 7 would be typically of the same order as angle *a*. Adjustment of the datum position to the axis 9 thus minimises the magnitude of the angular displacement of the prop from the right angled position represented by axis 7.

The restoring devices 34 provided in association with the props on the inner base element operate in the same manner as those for the props of the outer base element and art typically shown as mounted externally of the prop socket 23 but could be mounted internally thereof.

Internal mounting is of particular advantage in that the prop socket necessarily have dimensions in a direction longitudinally of the support and laterally of the support which exceed the diameter of the prop in order to provide the requisite strength and stiffness for the prop socket. Since the prop sockets are of hollow form and fabricated from plate material, there inevitably exists substantial clearance spaces in the interiors of these sockets between their upright walls and the prop within which the restoring device can be conveniently accommodated without increasing the external dimensions of the support as a whole.

Nevertheless, the external mounting of restoring devices, as indicated typically at 34, has some additional convenience as regards replacement of the resilient bodies or springs of the device as and when required.

Referring now to the application of the restoring device to the traction ram of the support shown in FIGS. 1 to 3, it will be understood that the piston rod 31 of the traction ram will be connected at its forward end to a section of the conveyor previously referred to.

In cases where the support is used in mine workings which have an inclination lengthwise of the coal face and hence longitudinally of the conveyor, there is often some drift of the conveyor in a direction downwardly of the incline not necessarily accompanied by corresponding drift on the part of the supports connected to the conveyor, especially where such supports are furnished with guiding devices 16 and 17 which can be utilised to correct downward drift.

In consequence of the relative drift of the conveyor the traction ram may be subjected to angular deflection about a vertical axis at the bracket **31*a***.

A restoring device may be mounted at one side of the adjacent side member of the base, as indicated generally at 32, to bring the traction ram into parallel relation with a medial longitudinally extending reference axis of the base of the support.

Such restoring device may be of any of the forms hereinbefore described with reference to FIGS. 4 to 17 subject, however, where necessary, to the modification that it would be provided with its own housing, the latter being adapted for securement to the side face of the side member 41.

The resilient means provided in such housing would apply restoring forces to the cylinder 30 of the traction ram in both directions as required in a horizontal plane and may, if desired, include resilient means for applying restoring forces in a vertical direction.

I claim:

1. In a mine roof support including a base having one or more upwardly extending props disposed thereon with freedom to tilt each about a respective tilting axis transverse to the length of the prop, a roof-engaging superstructure carried by the prop or props, and in association with at least one of said props, a restoring device for returning said prop to a predetermined datum position after it has undergone tilt and upon release of said prop from load bearing relation with the roof, said restoring device comprising:

(a) rigid upstanding socket means on said base for containing a lower end portion of said prop and providing for prop tilt at least in a selected direction and in the opposite direction from said datum position, (b) at least one resilient means carried by said socket means at a position spaced longitudinally of said prop from said tilting axis, said resilient means including an element which extends, in a direction substantially 90° from said selected direction, laterally beyond the prop contained in said socket and presents a contact face to said prop for applying a restoring force thereto to correct the tilt of said prop in said selected direction, said contact face extending in a direction substantially 90° from said selected direction and movably engaging said prop, (c) pre-stress means for subjecting said resilient means to a pre-stressed condition in a mode to provide a restoring force transverse to the length of a prop, and having an initial value above zero and increasing in response to tilt of said prop in said selected direction against said force, and (d) stop means for preventing release of said pre-stressed condition of said resilient means for positions of prop tilt in said opposite direction.

2. A device as claimed in claim 1 wherein:

(a) each of said props comprises a cylinder means and a piston means, one of which means is lowermost and carried by said base, and the other of which means is uppermost and carries said superstructure, (b) said socket means extends upwardly of and encloses at least the major proportion of said lowermost means of the prop contained therein, (c) said tilting axis is defined by prop support means adjacent the lower end of said socket means, (d) said resilient means is carried by said socket means adjacent to the upper end thereof.

3. A device as claimed in claim 1 wherein:

(a) at least two of said resilient means are carried by said socket means at respective angularly spaced positions about a longitudinally etxending reference axis of said prop, (b) a corresponding number of said pre-stress means are connected operatively with respective ones of said resilient means to pre-stress each of said resilient means to a degree independent of the other or others of said resilient means.

4. A device as claimed in claim 3 wherein a number of stop means corresponding to the number of resilient means are provided for preventing release of said pre-stressed condition of each of said resilient means independently of the stress condition of the other or others of said resilient means.

5. A device as claimed in claim 4 wherein:

(a) respective ones of said pre-stress means are carried by said socket means at positions spaced apart angularly by 90° or approximately so about said reference axis, (b) said resilient means includes respective elements presenting first and second contact faces towards said prop contained in said socket means for applying respective restoring forces thereto to correct the tilt of said prop in a first and second of said selected directions, at 90° or approximately so to each other as viewed in plan, (c) said first contact face extending in said second selected direction, and said second contact face extending in said first selected direction, (d) said first and second contact faces engaging movably with said prop to enable same to undergo tilt and restoration in said second and first direction respectively.

6. A device is claimed in claim 1 wherein:

(a) said resilient means comprises an element of elastic material, (b) said pre-stress means comprises stress applying members engaged with opposite sides of said element, means for setting said members to a pre-stressing separation less than the corresponding dimension of said element, (c) said stop means comprises means for preventing said members moving relatively to a separation greater than said pre-stressing separation.

7. A device as claimed in claim 6 wherein at least one tie member extends between said pressure applying members and has abutment means adjustable along said tie member to vary the value of pre-stress applied to said element of elastic material.

8. The device as claimed in claim 7 wherein:

(a) said resilient element and said stress-applying members are mounted in a space between said prop and a wall of said socket means with an inner one of said stress-applying members disposed between said prop and said resilient element, (b) said inner one of said stress-applying members is mounted for movement relatively to said socket means in a direction outwardly of said prop against the restoring force furnished by said resilient element and is prevented from movement in a direction towards said prop by said abutment means on said tie member, whereby said abutment means performs the dual functions of pre-stressing said resilient element and preventing release of said pre-stressed condition thereof.

9. A device as claimed in claim 7 wherein:

(a) said socket means contains one assembly comprising said resilient element, stress-applying members, tie member and abutment means at each of two opposite sides of said prop positioned to exert respective restoring forces inwardly of said prop along a first selected direction, (b) said socket means contains another of said assemblies at each of two opposite sides of said prop positioned to exert respective restoring forces inwardly of said prop along a second selected direction at 90° or approximately so to the first selected direction as viewed in plan.

10. A device as claimed in claim 9 wherein one pair of said assemblies on opposed sides of said prop is positioned at a distance from said tilting axis greater than that at which the other pair of said assemblies on opposed sides of said prop is situated.

11. A device is claimed in claim 6 wherein:

(a) an inner one of said stress applying members is situated between said elastic element and one side of said prop to apply restoring force thereto in one sense along said selected direction, (b) an outer one of said stress applying members is situated at an outer side of said resilient element remote from said prop, (c) a contact member is mounted on the opposite side of said prop, (d) means are provided connecting said contact member with said outer stress applying member to apply restoring force to said prop along said selected direction but in the opposite sense to that applied by said inner stress applying member, (e) said stop means includes abutment means preventing said inner stress applying member and said contact member having a relative separation less than the corresponding dimension between the sides of the prop against which said restoring forces are applied respectively.

12. A device as claimed in claim 1 wherein said resilient means, pre-stress means, and stop means are mounted in said socket means for angular adjustment about a longitudinally extending reference axis of said prop.

13. A device as claimed in claim 1 wherein said socket means comprises a housing in which said resilient means, pre-stress means, and stop means are contained and which is mounted for angular adjustment relative to a socket member upstanding from said base and about a longitudinally extending reference axis of said prop.

14. A device as claimed in claim 1 wherein said stop means includes means for adjusting the same to vary the datum position of the prop as required.

15. A device is clalmed in claim 1 wherein said pre-stress means includes adjustment means enabling the magnitude of said pre-stress to be varied as required.

16. A device as claimed in claim 1 wherein said resilient means includes:

(a) means presenting one stiffness characteristic over a range of tilt of said prop from its datum position,
(b) means presenting a higher or more steeply rising stiffness characteristic over a further range of tilt of said prop.

17. A device is claimed in claim 16 wherein said resilient means includes:

(a) a plurality of resilient elements,
(b) means for bringing said resilient means into operation in accordance with different modes considering said elements collectively for said successive ranges of tilt of said prop to provide respectively said different stiffness characteristics.

18. In a mine roof support including a base, one or more props disposed in respective sockets on the base with freedom to tilt therein each about a tilting axis transverse to the length of the prop, and a roof-engaging superstructure carried by the prop or props, a restoring device for returning the prop or at least one of same to a predetermined datum position upon release of such prop from load bearing relation with the roof, such restoring device comprising:

(a) a housing on said base,
(b) at least one resilient means in said housing for providing a restoring force directed against said prop in a selected direction transverse to the length of said prop and at a position spaced longitudinally of said prop from said tilting axis,
(c) pre-stress means for subjecting said resilient means to pre-stress in a mode such as to oppose tilt of said prop from said datum position in said selected direction, and
(d) stop means opposing said pre-stress means for preventing said prop from being displaced by said pre-stress means from said datum position, and wherein said resilient means includes:
(e) means presenting one stiffness characteristic over a range of tilt of said prop from its datum position,
(f) means presenting a higher or more steeply rising stiffness characteristic over a further range of tilt of said prop,
(g) a plurality of resilient elements,
(h) means for bringing said resilient elements collectively into operation in accordance with different modes for said successive ranges of tilt of said prop to provide said difference stiffness characteristics, and wherein
(i) said resilient elements are arranged between said prop and said housing to act in series with each other to establish the required restoring force against said prop,
(j) abutment means are provided in association with one of said resilient elements to limit the extent to which same can be subjected to elastic strain at the termination of the first said range of tilt of said prop whereby further tilt in the second said range strains only the remaining resilient element or elements.

19. A device as claimed in claim 17 wherein (a) said resilient elements are mounted between said prop and a wall of said socket means to act in parallel with each other to establish the required restoring force against said prop,
(b) one at least of said resilient elements is arranged to be maintained out of load bearing relation between said wall and said prop during tilt of the latter in the first said range from the datum position of said prop.

20. In a mine roof support including a base, one or more props disposed in respective sockets on the base with freedom to tilt therein each about a tilting axis transverse to the length of the prop, and a roof-engaging superstructure carried by the prop or props, a restoring device for returning the prop or at least one of same to a predetermined datum position upon release of such prop from load bearing relation with the roof, such restoring device comprising:

(a) a housing on said base,
(b) at least one resilient means in said housing for providing a restoring force directed against said prop in a selected direction transverse to the length of said prop and at a position spaced longitudinally of said prop from said tilting axis,
(c) pre-stress means for subjecting said resilient means to pre-stress in a mode such as to oppose tilt of said prop from said datum position in said selected direction, and
(d) stop means opposing said pre-stress means for preventing said prop from being displaced by said pre-stress means from said datum position, and wherein said resilient means includes:
(e) means presenting one stiffness characteristic over a range of tilt of said prop from its datum position,
(f) means presenting a higher or more steeply rising stiffness characteristic over a further range of tilt of said prop,
(g) a plurality of resilient elements,
(h) means for bringing said resilient elements collectively into operation in accordance with different modes for said successive ranges of tilt of said prop to provide said difference stiffness characteristics, and wherein
(i) two of said resilient elements are mounted in said housing at diametrically opposed positions with respect to a longitudinal reference axis of said prop,
(j) force transmitting means providing a lost motion connection during a first stage of tilt of said prop towards one of said resilient elements connects this resilient element with the other resilient element, whereby the latter is subjected to increase in stress beyond said pre-stress only over a range of prop tilt beyond the first said range.

21. A device as claimed in claim 20 wherein said force transmitting means includes adjustment means for varying the magnitude of said lost motion.

22. A device as claimed in claim 1 wherein (a) a plurality of said resilient means are contained in said socket means at respective angular positions about a longitudinally extending reference axis of said prop,
(b) each resilient means comprises a body of rubber or other resilient non-metallic material having its characteristics of elasticity,
(c) a corresponding number of said pre-stress means are associated operatively with respective ones of said bodies to apply respective independent compressive pre-stresses to said bodies,
(d) each of said bodies is mounted in said socket means to be further compressed in response to tilt of said prop in substantially the same direction as that in which it is subjected to compressive pre-stress by its associated one of said pre-stress means, (e) a corresponding number of said stop means associated operatively with respective ones of said bodies are provided for preventing release of said pre-stressed condition of said bodies when free from subjection to said further compression.

23. A device as claimed in claim 1 wherein (a) said resilient means comprises a metal spring including one or more leaves, (b) said pre-stress means is operatively connected with said metal spring to subject same to bending stress.

24. A mine roof support comprising:

(a) a base having a plurality of upstanding rigid socket means, (b) props mounted in said socket means for tilting movement to a limited extent about respective axes adjacent to lower ends of said props, (c) a roof-engaging superstructure carried by said props, (d) traction means for advancing said support, and (e) means for restoring said props to respective datum positions about said axes when said superstructure is out of load bearing relation with said roof, said means comprising, in association with each of said props, (i) a resilient element in the socket means containing said prop, said element being mounted adjacent to the upper end of said socket means and being in a condition of pre-stress to provide a threshold value of restoring force in a selected direction transverse to a longitudinal reference axis of said prop, said resilient element presenting a contact surface to said prop which is tangential to and extends laterally of said prop, (ii) stop means for preventing release of said restoring force to said prop except in response to tilt thereof outwardly from said datum position along said selected direction.

25. A mine roof support as claimed in claim 24 wherein each of said socket means contains (a) at least one assembly comprising one of said resilient elements and associated stop means, said element being pre-stressed compressively and disposed between a side of said prop and a wall of said socket means having its inner face presented along the direction of advance of said support, (b) at least one further assembly comprising another one of said resilient elements and associated stop means, said element being pre-stressed compressively and disposed between another side of said prop and another wall of said socket means having its inner face presented along a direction at right angles or approximately so to said direction of advance.

26. A mine roof support comprising:

(a) a base for standing on a floor surface of the mine, (b) a plurality of upstanding props on said base, (c) a superstructure carried by said props at their upper ends for engaging and supporting the roof, (d) a pressure fluid ram for advancing said support, (e) means connecting said ram to said support for angular movement about an axis transverse to the length of said ram at one position along its length, (f) means for restoring said ram to a predetermined datum position from a position of angular displacement therefrom about said axis upon discontinuance or reduction of a force producing said displacement comprising:

(i) a housing extending about said ram, (ii) at least one resilient means in said housing for acting between a wall of said housing and said ram, (iii) pre-stress means for subjecting said resilient means to a pre-stressed condition in a mode to provide a restoring force transverse to the length of said ram and having an initial value above zero and increasing in response to tilt of said prop in a selected direction against said force, (iv) stop means for preventing release of said pre-stressed condition of said resilient means for positions of angular displacement of said ram in a direction opposite to said selected direction.

27. A mine roof support as claimed in claim 26 wherein:

(a) said ram comprises piston and cylinder elements and is oriented when in its datum position with a longitudinally extending reference axis of the ram extending longitudinally of the support and direction of advancement, (b) said connecting means connects one of said elements of said ram to said base at a position adjacent to one end of said ram, (c) said restoring means connects the last said element of said ram to said base adjacent to the end of said element remote from said connecting means (d) said one resilient means acts between a horizontally presented side of said ram and said housing.

28. A mine roof support as claimed in claim 27 wherein:

(a) a plurality of assemblies of said resilient means, pre-stress means, and stop means are provided, (b) one of said resilient means acts between a horizontally presented side of said ram and said housing, and a further one of said resilient means acts between a vertically presented side of said ram and said housing, (c) said one and said further one of said resilient means include respective elements presenting contact faces towards said ram and respectively extending vertically and horizontally, and having slidable contact with said ram whereby these resilient means are subjected to stress above said pre-stressed condition only in response to horizontal and vertical angular displacements of said ram respectively.

References Cited

UNITED STATES PATENTS

| | | | |
|---|---|---|---|
| 3,192,722 | 7/1965 | Herrmann et al. | 61—45 |
| 3,269,686 | 8/1966 | Allen | 61—45 X |
| 3,309,054 | 3/1967 | Davis-Ratcliffe | 61—45 |
| 3,323,771 | 6/1967 | Dowty | 61—45 |
| 3,328,968 | 7/1967 | Weirich | 61—45 |

FOREIGN PATENTS

| | | |
|---|---|---|
| 779,791 | 7/1957 | Great Britain. |
| 990,413 | 4/1965 | Great Britain. |
| 983,079 | 2/1965 | Great Britain. |

DENNIS L. TAYLOR, Primary Examiner

U.S. Cl. X.R.

248—357